United States Patent
Summers

[11] Patent Number: 6,087,622
[45] Date of Patent: Jul. 11, 2000

[54] LOW COST ASSEMBLY OF WIRELESS LOAD BEAM SUSPENSIONS

[75] Inventor: Robert Summers, Temecula, Calif.

[73] Assignee: Magnecomp Corp., Temecula, Calif.

[21] Appl. No.: 09/384,790

[22] Filed: Aug. 26, 1999

Related U.S. Application Data

[60] Provisional application No. 60/141,920, Jun. 30, 1999.

[51] Int. Cl.[7] .................................................. B23K 26/20
[52] U.S. Cl. .............................. 219/121.64; 219/121.72; 219/121.85; 29/603.03
[58] Field of Search .................... 219/121.63, 121.64, 219/121.72, 121.85; 29/603.03, 831

[56] References Cited

U.S. PATENT DOCUMENTS

| | | | |
|---|---|---|---|
| 5,673,484 | 10/1997 | Masaichi et al. | 29/896.93 |
| 5,687,479 | 11/1997 | Bennin et al. | 29/885 |
| 5,821,494 | 10/1998 | Albrecht et al. | 219/121.64 |
| 5,857,257 | 1/1999 | Inaba | 29/603.04 |

FOREIGN PATENT DOCUMENTS 2-249182   10/1990   Japan .

*Primary Examiner*—Gregory Mills
*Attorney, Agent, or Firm*—Louis J. Bachand

[57] ABSTRACT

Assembly of wireless conductors onto load beams by putting up the wireless conductors in a pattern that is a multiple of the number of load beams on a fret, and indexing the pattern of wireless conductors corresponding multiple times for a succession of load beam frets in a laser welding station and welding after each indexing.

11 Claims, 2 Drawing Sheets

LOW COST ASSEMBLY OF WIRELESS LOAD BEAM SUSPENSIONS

REFERENCE TO RELATED APPLICATION

This application claims the benefit of U.S. Provisional Application Ser. No. 60/141,920 filed Jun. 30, 1999.

BACKGROUND OF THE INVENTION

1. Field of the Invention

This invention relates to disk drive suspensions, and more particularly to disk drive suspension assemblies of load beams and wireless conductors having attached flexures. In particular, the invention relates to a production method for attaching a plurality of such conductors to successive frets of plural load beams using high density patterns of the conductors, and indexing a single pattern for multiple ones of the load beam frets.

2. Related Art

The assembly of wireless conductors, incorporating load flexure portions or not, to load beams requires the precise positioning of the parts to be welded together. It is known to have frets of load beams in a jig and to hand place the wireless conductors selected from a loose collection thereof. This is labor intensive and not as accurate as desired.

SUMMARY OF THE INVENTION

Registration with fretted load beams of wireless conductors carried as multiples in a single pattern is potentially more accurate and less labor intensive, but the cost of wireless conductor patterns, laminates of a dielectric layer, conductive traces and a metal layer, is too great to allow the waste inherent in registration with fretted load beams.

It is an object, therefore, of the present invention to provide an improved method for the assembly of wireless conductors and load beams. It is a further object to provide such a method in which the load beams on their fret are matched to a corresponding set of unseparated wireless conductors, the wireless conductors being but one of many sets in the pattern, and indexing the pattern relative to the load beam fret locus for attachment to a succession of frets of load beams.

These and other objects of the invention to become apparent hereinafter are realized in the method of attaching to load beams flexure-bearing wireless conductors comprising a laminate of a plastic insulative layer and conductive traces, including (1) arranging at a laser welding station a first load beam fret comprising a first plurality of load beams at a predetermined fixed spacing, (2) juxtaposing with the load beam fret at the welding station a first plurality of wireless conductors carried unseparated in a wireless conductor pattern comprising within the station multiple pluralities of wireless conductors at a spacing that is a fraction of the fixed load beam fret spacing, (3) laser welding together the juxtaposed first pluralities of load beams and wireless conductors to form a first series of suspensions comprising a wireless conductor, a flexure and a load beam, (4) separating the wireless conductors from their pattern, (5) arranging at the laser welding station a second load beam fret comprising a second plurality of load beams at the predetermined fixed spacing, and (6) indexing the wireless conductor pattern within the station a distance less than the load beam predetermined spacing and corresponding to the spacing fraction and sufficient to register a second plurality of wireless conductors with the second plurality of load beams, and repeating steps (1) through (6) with additional frets of load beams until all wireless conductors of the wireless conductor pattern are welded to the load beams.

In this and like embodiments, typically, the invention also includes spacing the wireless conductors in the wireless conductor pattern at one-third to one-fifth the predetermined spacing of load beams on the load beam frets, and indexing the wireless conductor pattern three to five times, respectively, within the laser welding station to register the wireless conductors with opposing load beams on three to five, respectively, load beam frets, cutting the wireless conductors from their the pattern with the laser to separate the wireless conductors in Step (4), selecting as the wireless conductor pattern a pattern of wireless conductors comprising a laminate of a dielectric film layer, trace conductors on the dielectric layer, and a metal layer, wherein, typically. the metal layer is a spring steel and the dielectric film comprises polyimide film.

BRIEF DESCRIPTION OF THE DRAWINGS

The invention will be further described in conjunction with the attached drawings in which.

DETAILED DESCRIPTION

Figure 1:
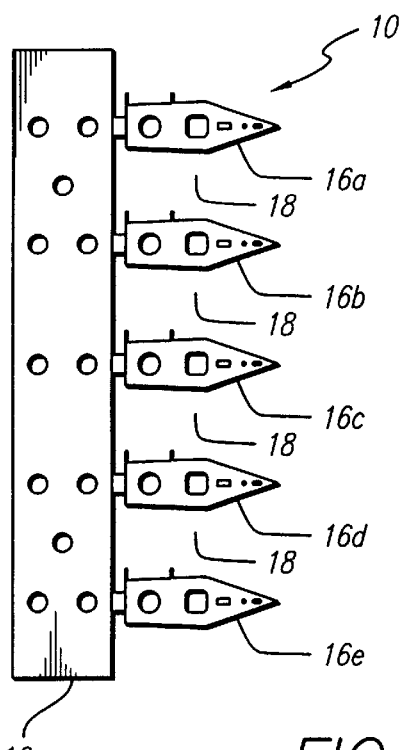
FIG. 1 is a plan view of a fret of five load beams at a predetermined spacing.
Figure 3:
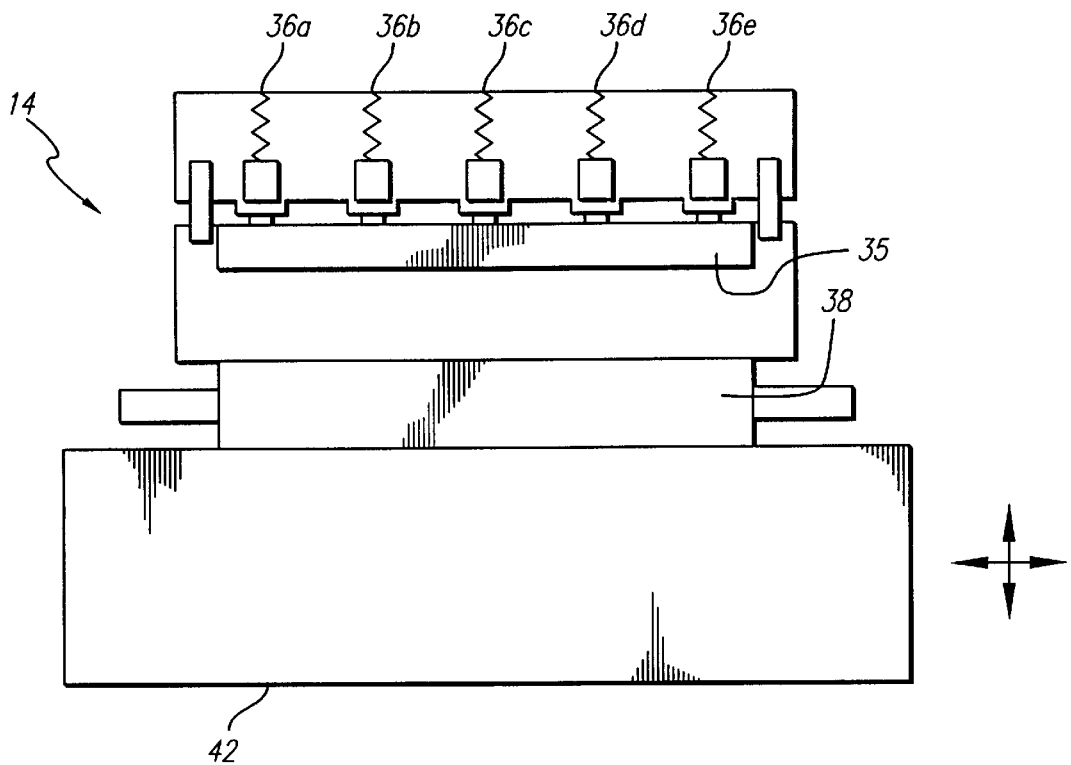
Figure 2:
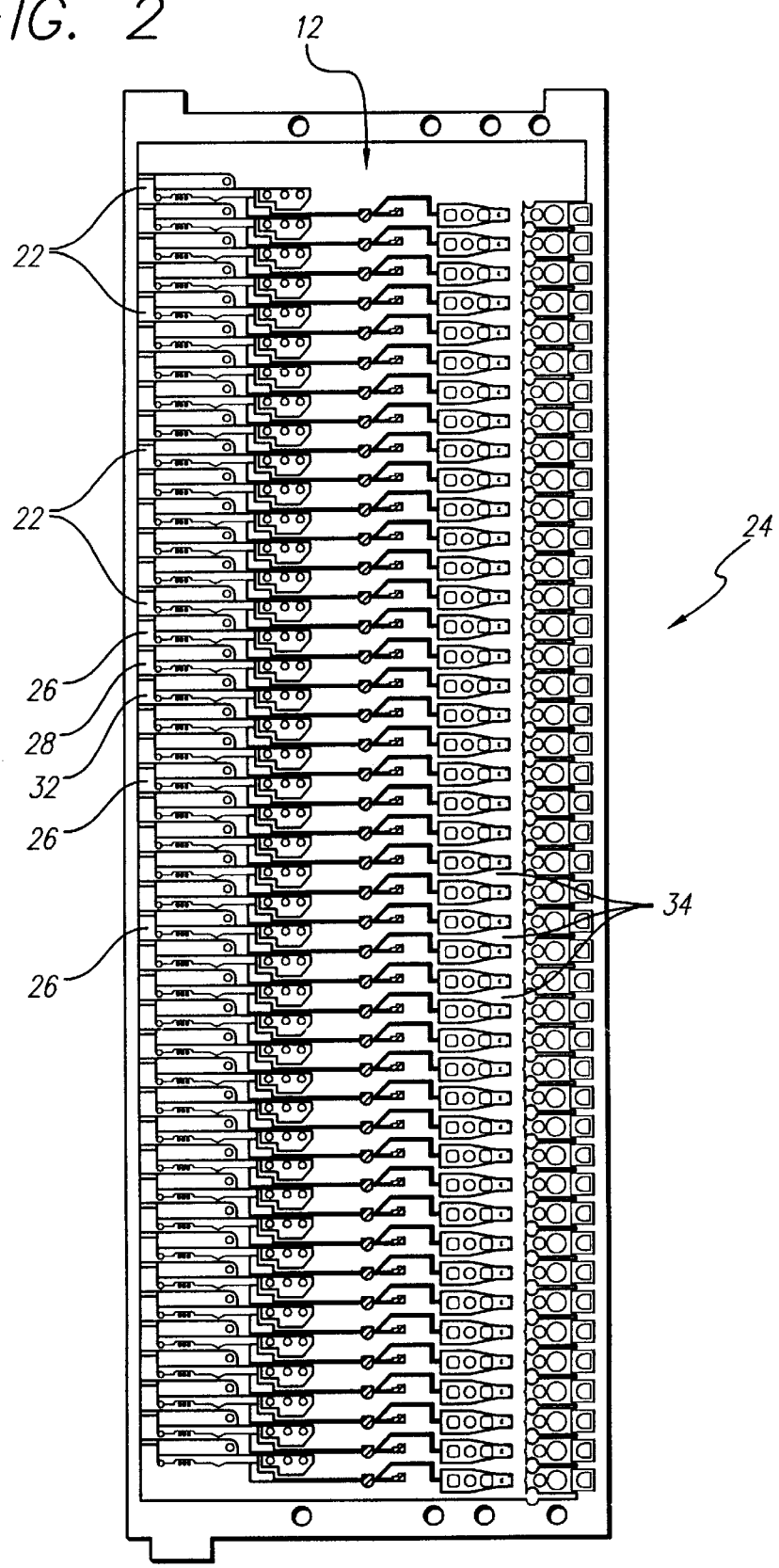
FIG. 2 is a plan view of a pattern of wireless conductors at one-fourth the predetermined spacing of the load beams on their fret; and, FIG. 3 is a front elevation view of a laser welding station having multiple positions in which the pattern of wireless conductors is multiply indexable relative to the individual laser positions, each load beam fret having one load beam for each position.

With reference now to the drawings in detail, the method of attaching to load beams 10 flexure-bearing wireless conductors 12 comprising a laminate of a plastic insulative layer and conductive traces uses a laser welding station 14 to load a first load beam fret 16 comprising a first plurality of load beams 16a, 16b, 16c, 16d, and 16e at a predetermined fixed spacing 18. Juxtaposed with the load beam fret 16 at the welding station 14 is a first plurality of wireless conductors 22 carried unseparated in a wireless conductor pattern 24 for positioning within the station multiple pluralities 22, 26, 28, and 32 of the wireless conductors at a spacing 34 (centerline-to-centerline) that is a fraction (one-fourth) of the fixed load beam fret spacing 18. Load beams 16a–16e are positioned on bed 35 beneath the individual laser station lasers 36a, 36b, 36c, 36d and 36e, respectively, The first plurality 22 of five wireless conductors in the pattern 24 are juxtaposed with the load beams 16a–16e already positioned in the laser welding station 14 by mounting the pattern 24 in a shiftable holder 38 and positioning the holder in the station on X-Y table 42 with the first wireless conductor plurality registered with the load beams.

The juxtaposed, registered first pluralities of load beams 16a–16e and wireless conductors 22 are laser welded to form a first series of suspensions comprising typically the wireless conductor, a flexure and a load beam. Preferably, the wireless conductors in plurality 22 are separated from pattern 24 by the laser.

Following completion of the assembly of the first plurality of load beams 16a–16e with the first plurality of wireless conductors 22 in the just described step, a second load beam fret comprising a second plurality of load beams 16 at the predetermined fixed spacing 18 is introduced into the laser welding station 14 and registered with the lasers 36a–36e. The wireless conductor pattern 24 is already within the station 14. The holder 38 is indexed laterally (across the page) a distance to register the next successive plurality 26 of wireless conductors with the second fret load beams which are then welded as noted for the first plurality. The index distance is a function of the comparative spacing of the load on their frets and the wireless conductors in their pattern. In the drawings the wireless conductors have one-fourth the spacing of the load beams and are thus indexed four times to use all the wireless conductors on four successive frets of load beams. Other ratios are possible, e.g. 3 or 5, or other number as desired.

The wireless conductors are known per se and comprise a laminate of a dielectric film layer, trace conductors on the dielectric layer, and, optionally, a metal layer, wherein, typically. the metal layer is a spring steel and the dielectric film comprises polyimide film.

The invention thus provides an improved method for the assembly of wireless conductors and load beams in which the load beams on their fret are matched to a corresponding set of unseparated wireless conductors, the wireless conductors being but one of many sets in the pattern, and indexing the pattern relative to the load beam fret locus for attachment to a succession of frets of load beams. The foregoing objects are this met.

I claim:

1. Method of attaching to load beams flexure-bearing wireless conductors comprising a laminate of a plastic insulative layer and conductive traces, including (1) arranging at a laser welding station a first load beam fret comprising a first plurality of load beams at a predetermined fixed spacing, (2) juxtaposing with said load beam fret at the welding station a first plurality of wireless conductors carried unseparated in a wireless conductor pattern comprising within said station multiple pluralities of wireless conductors at a spacing that is a fraction of the fixed load beam fret spacing, (3) laser welding together said juxtaposed first pluralities of load beams and wireless conductors to form a first series of suspensions comprising a wireless conductor, a flexure and a load beam, (4) separating said wireless conductors from their pattern, (5) arranging at said laser welding station a second load beam fret comprising a second plurality of load beams at said predetermined fixed spacing, and (6) indexing said wireless conductor pattern within said station a distance less than said load beam predetermined spacing and corresponding to said spacing fraction and sufficient to register a second plurality of wireless conductors with said second plurality of load beams, and repeating steps (1) through (6) with additional frets of load beams until all wireless conductors of said wireless conductor pattern are welded to said load beams.

2. The method according to claim 1, including also spacing said wireless conductors in said wireless conductor pattern at one-third to one-fifth the predetermined spacing of load beams on said load beam frets, and indexing said wireless conductor pattern three to five times, respectively, within said laser welding station to register said wireless conductors with opposing load beams on three to five, respectively, load beam frets.

3. The method according to claim 1, including also cutting said wireless conductors from their said pattern with said laser to separate said wireless conductors in Step (4).

4. The method according to claim 1, including also selecting as said wireless conductor pattern a pattern of wireless conductors comprising a laminate of a dielectric film layer, trace conductors on said dielectric layer, and a metal layer.

5. The method according to claim 4, in which said metal layer is a spring steel.

6. The method according to claim 4, in which said dielectric film comprises polyimide film.

7. The method according to claim 4, including also spacing said wireless conductors in said wireless conductor pattern at one-third to one-fifth the predetermined spacing of load beams on said load beam frets, and indexing said wireless conductor pattern three to five times, respectively, within said laser welding station to register said wireless conductors with opposing load beams on three to five, respectively, load beam frets.

8. The method according to claim 7, including also cutting said wireless conductors from their said pattern with said laser to separate said wireless conductors in Step (4).

9. The method according to claim 8, including also selecting as said wireless conductor pattern a pattern of wireless conductors comprising a laminate of a dielectric film layer, trace conductors on said dielectric layer, and a metal layer.

10. The method according to claim 9, in which said metal layer is a spring steel.

11. The method according to claim 10, in which said dielectric film comprises polyimide film.

* * * * *